US012678725B2

(12) United States Patent
Birnkrant et al.

(10) Patent No.: US 12,678,725 B2
(45) Date of Patent: Jul. 14, 2026

(54) STACKABLE AIR TREATMENT DEVICE

(71) Applicant: Carrier Corporation, Palm Beach Gardens, FL (US)

(72) Inventors: Michael J. Birnkrant, Manlius, NY (US); Peter J. McKinney, Boulder, CO (US); Bridget Volz, Lizton, IN (US); Holly Rhodes, Carmel, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 788 days.

(21) Appl. No.: 18/075,996

(22) Filed: Dec. 6, 2022

(65) Prior Publication Data

US 2023/0173422 A1    Jun. 8, 2023

Related U.S. Application Data

(60) Provisional application No. 63/286,334, filed on Dec. 6, 2021.

(51) Int. Cl.

| | |
|---|---|
| *B01D 46/00* | (2022.01) |
| *B01D 46/24* | (2006.01) |
| *B01D 46/42* | (2006.01) |
| *B01D 46/44* | (2006.01) |
| *B01D 46/60* | (2022.01) |
| *B01D 46/64* | (2022.01) |

(52) U.S. Cl.
CPC ......... *B01D 46/0013* (2013.01); *B01D 46/24* (2013.01); *B01D 46/4245* (2013.01); *B01D 46/442* (2013.01); *B01D 46/60* (2022.01);

*B01D 46/64* (2022.01); *B01D 2267/40* (2013.01); *B01D 2267/60* (2013.01); *B01D 2279/40* (2013.01)

(58) Field of Classification Search
None
See application file for complete search history.

(56) References Cited

U.S. PATENT DOCUMENTS

| | | | | |
|---|---|---|---|---|
| 2006/0277875 A1* | 12/2006 | Schuld | ................. | B01D 46/521 |
| | | | | 55/484 |
| 2007/0095746 A1* | 5/2007 | Minichello | ............ | B01D 29/52 |
| | | | | 55/342 |
| 2014/0000228 A1* | 1/2014 | Enderich | ................ | B01D 46/60 |
| | | | | 55/484 |
| 2014/0020561 A1* | 1/2014 | Aery | ...................... | B01D 46/60 |
| | | | | 55/467 |

(Continued)

FOREIGN PATENT DOCUMENTS

| | | | | | |
|---|---|---|---|---|---|
| CN | 102384534 A | * | 3/2012 | .............. | F24F 11/00 |
| CN | 105757865 B | * | 12/2018 | ................ | F24F 6/14 |

(Continued)

*Primary Examiner* — Brit E. Anbacht
(74) *Attorney, Agent, or Firm* — CANTOR COLBURN LLP

(57) ABSTRACT

A stackable air treatment device is provided and includes a base, a cover, a plurality of air treatment modules modularly stackable between the base and the cover in groups of one or more to form a stack with the base and the cover and a blower configured to move air from an exterior of the stack into the stack and out through the cover. Each air treatment module in the stack is configured to purify, clean, and/or condition the air moved by the blower.

9 Claims, 4 Drawing Sheets

(56) References Cited

U.S. PATENT DOCUMENTS

| | | | | |
|---|---|---|---|---|
| 2017/0246570 A1* | 8/2017 | Park | ....................... | B01D 46/24 |
| 2017/0246572 A1* | 8/2017 | Park | ......................... | F24F 8/80 |
| 2017/0246576 A1* | 8/2017 | Jung | ..................... | B01D 46/24 |
| 2017/0246578 A1* | 8/2017 | Jung | ..................... | B01D 46/24 |
| 2017/0246579 A1* | 8/2017 | Mun | ................... | B01D 46/0008 |
| 2017/0246580 A1* | 8/2017 | Bae | ......................... | F24F 8/108 |
| 2017/0246581 A1* | 8/2017 | Jung | ......................... | F24F 8/10 |
| 2017/0246582 A1* | 8/2017 | Park | ......................... | F24F 8/80 |
| 2017/0248153 A1* | 8/2017 | Park | ...................... | F04D 29/703 |
| 2017/0248339 A1* | 8/2017 | Mun | ................... | B01D 46/0047 |
| 2018/0001248 A1* | 1/2018 | Jung | ................. | B01D 46/2411 |
| 2018/0023579 A1* | 1/2018 | Park | ...................... | F04D 29/703 |
| | | | | 310/40.5 |
| 2018/0207568 A1* | 7/2018 | Jung | ................... | F24F 1/0071 |
| 2019/0264948 A1* | 8/2019 | Jung | ......................... | A61L 2/22 |
| 2019/0331137 A1* | 10/2019 | Xiao | .................... | F04D 29/325 |
| 2019/0368774 A1* | 12/2019 | Chen | ...................... | F24F 13/28 |
| 2020/0003440 A1* | 1/2020 | Kim | ......................... | F24F 11/52 |
| 2020/0158357 A1* | 5/2020 | Son | ....................... | F04D 25/166 |
| 2021/0162327 A1* | 6/2021 | Yang | .................. | F04D 29/441 |
| 2021/0278097 A1* | 9/2021 | Min | ......................... | F24F 13/20 |
| 2022/0008855 A1* | 1/2022 | Yang | ......................... | F24F 8/10 |
| 2022/0008856 A1* | 1/2022 | Yang | ................. | B01D 46/0049 |
| 2022/0010991 A1* | 1/2022 | Yang | ........................ | F24F 8/80 |
| 2022/0011009 A1* | 1/2022 | Lee | ......................... | F24F 13/20 |
| 2022/0011011 A1* | 1/2022 | Yang | .................... | F24F 13/082 |
| 2022/0212133 A1* | 7/2022 | Kim | ....................... | F24F 8/108 |
| 2022/0212522 A1* | 7/2022 | Skipton | ............. | B60H 1/00364 |

FOREIGN PATENT DOCUMENTS

| | | | | | |
|---|---|---|---|---|---|
| CN | 109520024 A | * | 3/2019 | ............. | F24F 11/89 |
| KR | 20240041031 A | * | 3/2024 | ............. | F24F 11/39 |
| WO | WO-2022085871 A1 | * | 4/2022 | ............. | F24F 8/22 |
| WO | WO-2024014708 A1 | * | 1/2024 | ............. | F24F 8/80 |

* cited by examiner

101

AIR OUT 150
120
130

VERTICAL
STACKING
DIRECTION 140
130
110

122
121
133
113
132
160
160
161

AIR
(360 DEGREES
AROUND EACH
CYLINDER)

HORIZONTAL STACKING DIRECTION

500

501 — DETERMINING A CAPACITY OF A SOURCE OF AIR POLLUTION IN A SPACE

502 — SELECTING A GROUP OF ONE OR MORE AIR TREATMENT MODULES FROM A SET OF AIR TREATMENT MODULES TO PROVIDE AN AIR PURIFYING CAPACITY THAT MEETS THE CAPACITY OF THE SOURCE OF THE AIR POLLUTION

503 — STACKING THE GROUP OF THE ONE OR MORE AIR TREATMENT MODULES BETWEEN A BASE AND A COVER TO FORM A STACK CONFIGURED TO REMOVE THE AIR POLLUTION FROM AIR IN THE SPACE TO THEREBY PURIFY THE AIR IN THE SPACE

HAS THE CAPACITY OF THE SOURCE OF AIR POLLUTION IN THE SPACE CHANGED?

NO — LEAVING STACK UNCHANGED

YES

504 — INTERCHANGING ONE OR MORE AIR TREATMENT MODULES WITH ANY OF THE ONE OR MORE AIR TREATMENT MODULES IN THE STACK

FIG. 5

STACKABLE AIR TREATMENT DEVICE

CROSS-REFERENCE TO RELATED APPLICATIONS

This application claims priority to U.S. Provisional Application Ser. No. 63/286,334, filed Dec. 6, 2021, the contents of which are hereby incorporated by reference in its entirety.

BACKGROUND

The present disclosure relates to air purification and, more particularly, to a stackable air purifier or air treatment device and methods of using a stackable air purifier or an air treatment device.

Air pollution is the presence of substances in the atmosphere that are harmful to the health of humans and other living beings, or cause damage to the climate or to materials. There are many different types of air pollutants, such as gases (including ammonia, carbon monoxide, sulfur dioxide, nitrous oxides, methane, carbon dioxide and chlorofluorocarbons), particulates (both organic and inorganic) and biological molecules. Air pollution may cause diseases, allergies and even death to humans; it may also cause harm to other living organisms such as animals and food crops, and may damage the natural environment (for example, climate change, ozone depletion or habitat degradation) or built environment (for example, acid rain). Both human activity and natural processes can generate air pollution.

BRIEF DESCRIPTION

According to an aspect of the disclosure, a stackable air treatment device is provided and includes a base, a cover, a plurality of air treatment modules modularly stackable between the base and the cover in groups of one or more to form a stack with the base and the cover and a blower configured to move air from an exterior of the stack into the stack and out through the cover. Each air treatment module in the stack is configured to purify, clean and/or condition the air moved by the blower.

In accordance with additional or alternative embodiments, the blower is included in at least one of the air treatment modules, the base or the cover.

In accordance with additional or alternative embodiments, the base, the cover and each of the air treatment modules includes a stacking element for engagement with a corresponding stacking element of a neighbor in the stack.

In accordance with additional or alternative embodiments, a stacking direction of the stack is vertical or horizontal.

In accordance with additional or alternative embodiments, a portion of the air treatment modules have differing capacities.

In accordance with additional or alternative embodiments, at least two air treatment modules are stackable between the base and the cover and are operable in series and/or in parallel.

In accordance with additional or alternative embodiments, the cover is formed to define an aperture and includes filter media in the aperture.

In accordance with additional or alternative embodiments, the base and the air treatment modules each include an inter-module power connector and the stackable air treatment device further includes a power distribution system configured to distribute power from the base to each air treatment module in the stack via the inter-module power connectors.

In accordance with additional or alternative embodiments, for each air treatment module filter media is cylindrical and the blower is disposed within the filter media and configured to draw the air through the filter media in 360° directions and subsequently to blow the air longitudinally.

In accordance with additional or alternative embodiments, at least one of an air quality monitor is operably disposed to sense a quality of the air moved by the blower and a control panel is operably disposed on one of the cover and the base, the control panel being disposed and configured to control operations of the air treatment modules in the stack.

According to an aspect of the disclosure, a stackable air treatment device is provided and includes a base, a cover and a set of air treatment modules that are respectively interchangeable with one another to be modularly stackable between the base and the cover in groups of one or more to form a stack with the base and the cover. Each air treatment module in the stack includes filter media and a blower configured to move air from an exterior of the stack through the filter media and subsequently to and through the cover.

In accordance with additional or alternative embodiments, the base, the cover and each of the air treatment modules includes a stacking element for engagement with a corresponding stacking element of a neighbor in the stack and a stacking direction of the stack is vertical or horizontal.

In accordance with additional or alternative embodiments, a portion of the air treatment modules have differing capacities.

In accordance with additional or alternative embodiments, at least two air treatment modules are stackable between the base and the cover and are operable in series or in parallel.

In accordance with additional or alternative embodiments, the cover is formed to define an aperture and includes filter media in the aperture.

In accordance with additional or alternative embodiments, the base and the air treatment modules each include an inter-module power connector and the stackable air treatment device further includes a power distribution system configured to distribute power from the base to each air treatment module in the stack via the inter-module power connectors.

In accordance with additional or alternative embodiments, for each air treatment module the filter media is cylindrical and the blower is disposed within the filter media and configured to draw the air through the filter media in 360° directions and subsequently to blow the air longitudinally.

In accordance with additional or alternative embodiments, at least one of an air quality monitor is operably disposed to sense a quality of the air moved by the blower and a control panel is operably disposed on one of the cover and the base, the control panel being disposed and configured to control operations of the air treatment modules in the stack.

According to an aspect of the disclosure, a method of air pollution management is provided and includes determining a capacity of a source of air pollution in a space, selecting a group of one or more air treatment modules from a set of air treatment modules to provide an air purifying capacity that meets the capacity of the source of the air pollution and stacking the group of the one or more air treatment modules between a base and a cover to form a stack configured to remove the air pollution from air in the space to thereby purify the air in the space.

In accordance with additional or alternative embodiments, the method further includes interchanging one or more air treatment modules with any of the one or more air treatment modules in the stack as the capacity of the source of the air pollution in the space changes.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIG. 5 is a flow diagram illustrating an exemplary method of air pollution management in accordance with embodiments.

DETAILED DESCRIPTION

Air pollution management may encompass the monitoring and/or mitigation of one or more pollutants, such as (but not limited to), gases (including ammonia, carbon monoxide, sulfur dioxide, nitrous oxides, methane, carbon dioxide and chlorofluorocarbons), particulates (both organic and inorganic) and biological molecules. Air pollution management is generally based on a size or capacity of a source of air pollution. However, since equipment is typically purchased based on a customer's best guess to the pollution source, the units that are purchased are often undersized in some parts of a space and oversized in other parts. Also, different air treatment devices that function or operate differently, such as a molecular filter versus a particular filter, tend to require replacement/servicing at different times making a modular solution more desirable over an all-in-one device. In addition, from a warehousing perspective, it is necessary to store and manufacture each unit separately.

Thus, as will be described below, a stackable air treatment device is provided and includes stackable hardware (air treatment modules) that can serve to treat, purify, clean or otherwise condition air moving through it. Each module can work together with one or more other modules to manage air pollution based on a size of the source of air pollution. Modules can be added for larger pollution source management while modules can be removed or separated if a separate space needs to be cleaned. In some cases, each module in the stack is self-contained and includes a motor, a fan, and a filter. In addition, each module can provide a different function. That is, one module can provide humidity control, while another provides airborne particulate filtration, and a third provides molecular air filtration. Also, one or more modules can be a dual function module such as a particulate/molecular filtration combination module or a particulate filtration/humidity control combination module. Power is supplied and then distributed through the stack via electrical contacts. In addition, the modules may be able to communicate with each other via mesh blue tooth. Extensions could include internal air quality (IAQ) monitors.

Figure 1:
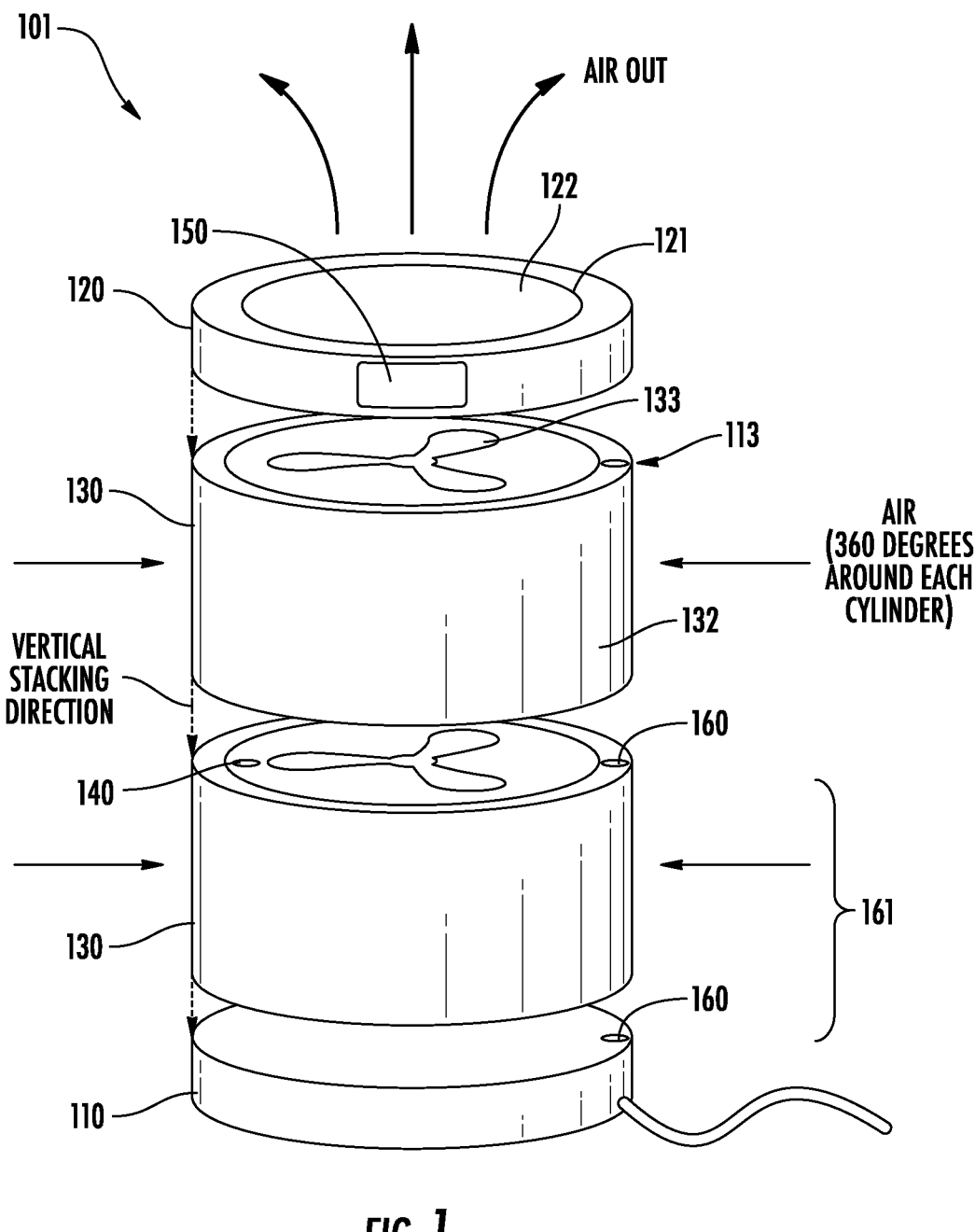
FIG. 1 is a perspective view of exemplary stackable air treatment modules provided in series and stacked in a vertical stacking direction in accordance with embodiments.

With reference to FIG. 1, a stackable air treatment device 101 is provided. The stackable air treatment device 101 includes a base 110, a cover 120, and a set of air treatment modules 130. The air treatment modules 130 are respectively interchangeable with one another to be modularly stackable between the base 110 and the cover 120 in groups of one or more to form a stack 131 with the base 110 and the cover 120. Each air treatment module 130 in the stack 131 can include, but is not required to include, filter media 132 and a blower 133 (particularly, in the case of the air treatment devices 13 being air purification devices). In these or other cases, the blower 133 is configured to move air from an exterior of the stack 131 through the filter media 132 and subsequently to and through the cover 120. The cover 120 can be formed to define an aperture 121 through which the air moved by the blower 133 can flow. The cover 120 can also include secondary filter media 122 in the aperture 121.

The stack 131 and each air treatment module 130 in the stack 131 can have various shapes and sizes, such as rectangular or cylindrical shapes. In the cases in which the stack 131 and each of the air treatment modules 130 are cylindrical and provided as air purification devices, as noted above, the filter media 132 can be cylindrical and the blower 133 is disposed within a center of the filter media 132. In this location, the blower 133 is disposed and configured to draw the air through the filter media in 360° directions and subsequently to blow the air longitudinally toward the cover 120 and through the aperture 121 (and the secondary filter media 122 where applicable). This is illustrated in FIG. 1.

The stackable air treatment device 101 can also include at least one of an internal air quality (IAQ) monitor 140 and a control panel 150. The IAQ monitor 140 can be operably disposed within the stack 131 to sense a quality of the air moved by the blower 133 (where applicable). The control panel 150 can be operably disposed on one of the cover 120 and the base 110 and can be disposed and configured to control operations of the air treatment modules 130 in the stack 131.

The base 110 and the air treatment modules 130 can each include an inter-module power connector 160. In these or other cases, the stackable air treatment device 101 can further include a power distribution system 161. The power distribution system 161 is configured to distribute power from the base 110 to each air treatment module 130 in the stack 131 via at least the inter-module power connectors 160. This power can be provided as electrical power to drive the blower 133 of each air treatment module 130 in the stack 131 and to operate the IAQ monitor 140 and the control panel 150.

Alternatively, the base 110 or the cover 120 can each house a blower that provides air distribution to all of the air treatment modules 130 in the stack 131 either separately or in tandem. There could also be a controlling mechanism so that the blower runs at specific set points depending on how many air treatment modules 130 are provided in the stack 131 or how many stacks 131 are provided in a given space.

Within the set of the air treatment modules 130 are multiple individual air treatment modules 130 having various and differing capacities all of which are interchangeable with one another. In this way, the air treatment modules 130 can be selected for use in the stack 131 to satisfy air purification requirements or requirements of air pollution management for a given space (i.e., an indoor room in a building). These air purification requirements or the requirements of air pollution management for the given space can be defined based on a known or estimated capacity of a source of air pollution for the given space. Thus, if the source of the air pollution in a given space is known or estimated to be of a certain capacity, the stack 131 can be configured with a number of air treatment modules 130 that are respectively sized to cooperatively remove at least as much air pollution from the given space as the certain capacity. Air treatment modules 130 not included in the stack 131 can be used in other stacks 131 in other spaces. In any case, the air treatment modules 130 in a stack 131 do not all need to be a same size or shape in the stack 131 as long as they connect to each other and allow air to flow through the stack 131.

In any case, as the air purification, treatment or conditioning requirements or the requirements of air pollution management for the given space(s) change over time, the air treatment modules 130 can be switched into and out of stacks 131 and/or otherwise repaired, replaced, or discarded.

In accordance with additional embodiments, the stackable air treatment device 101 can be paired with another unit through a smart monitor to increase efficiency in air treatment. Also, users could get notifications on how to more efficiently treat their air through push notifications on how to build-on or shift their existing modular pieces.

Figure 2A:
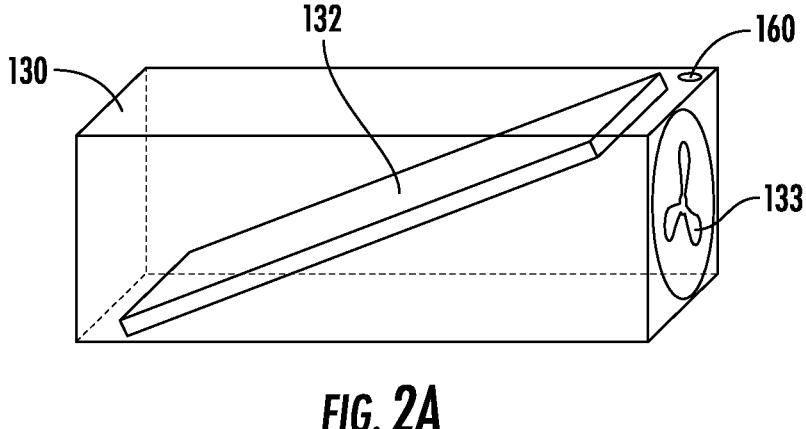
FIG. 2A is a perspective view of an exemplary stackable air treatment module in accordance with embodiments
Figure 2B:
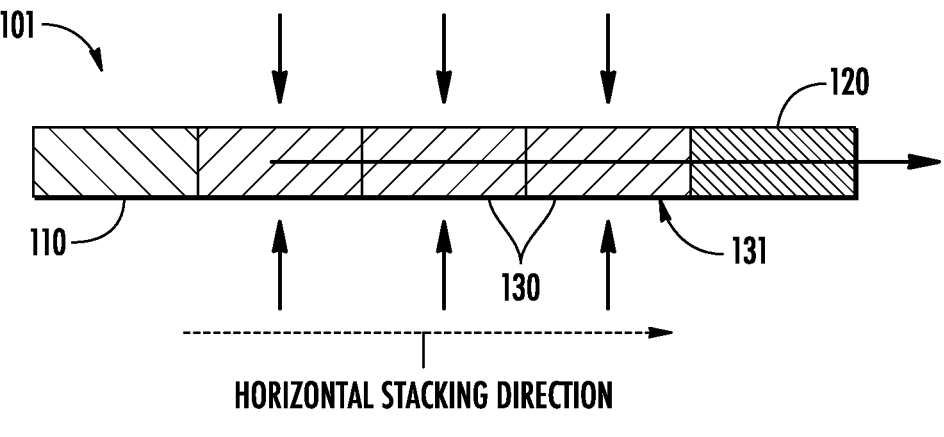
FIG. 2B is a schematic side view of exemplary stackable air treatment modules with a horizontal or lateral stacking direction in accordance with embodiments.

With continued reference to FIG. 1 and with additional reference to FIGS. 2A and 2B, the stacking direction of the stack 131 can vary. For example, in some cases, as shown in FIG. 1, the stacking direction of the stack 130 can be vertical. As an alternative example, as shown in FIG. 2A, the orientation of the air treatment modules 130 in the stack 131 can be horizontal or lateral while the stacking direction of the stack 131 can be vertical. As yet another example, as shown in FIG. 2B, an orientation of the air treatment modules 130 in the stack 131 can be horizontal or lateral and the stacking direction of the stack 131 can be horizontal or lateral. Unless otherwise stated, however, the instant description generally relates to the cases in which the stacking direction of the stack 131 is vertical. This is being done for clarity and brevity and is not intended to otherwise limit the scope of the description.

Figure 3:
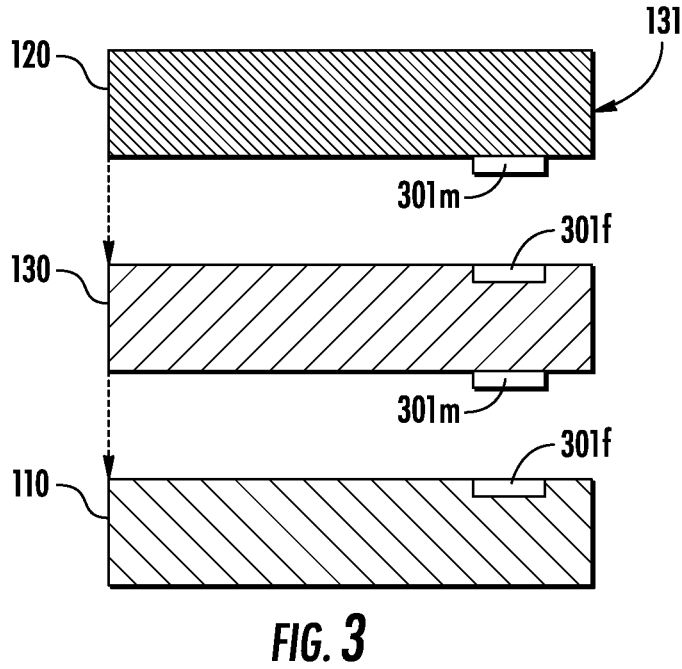
FIG. 3 is a schematic side view of the stackable air treatment modules of FIG. 1 with exemplary stacking elements in accordance with embodiments.

With reference to FIG. 3, the base 110, the cover 120 and each of the air treatment modules 130 include a stacking element 301m/301f for engagement with a corresponding stacking element 301m/301f of a neighbor in the stack 131. In accordance with embodiments, the base 110 has a stacking element 301f in its upper surface, the cover 120 has its stacking element 301m in its lower surface and each of the air treatment modules 130 have stacking elements 301f and 301m in their upper and lower surfaces, respectively. Thus, in a case in which one air treatment module 130 is stacked between the base 110 and the cover 120, the stacking element 301m in the lower surface of the one air treatment module 130 engages with the stacking element 301f in the upper surface of the base 110 while the stacking element 301f in the upper surface of the air treatment module 130 engages with the stacking element 301m in the lower surface of the cover 120. This pattern continues for cases in which two or more air treatment modules 130 are stacked between the base 110 and the cover 120. As shown in FIG. 3, the stacking element 301m and 301f can be provided as a male stacking element 301m and a female stacking element 301f.

The stacking elements 301m and 301f can engage with one another by a twisting or rotational movement, although it is to be understood that this is not required and that other engagements are possible. For example, the stacking elements 301m and 301f can be engageable with one another mechanically, magnetically and/or electro-magnetically. As another example, studs could be provided with heads protruded from a bottom of a stackable section and a keyhole slot can be provided on a top of each section. The keyhole slots could be arranged to rotate and lock cylindrical sections together or slide linearly and lock horizontal parallel rectangular sections together.

Figure 4:
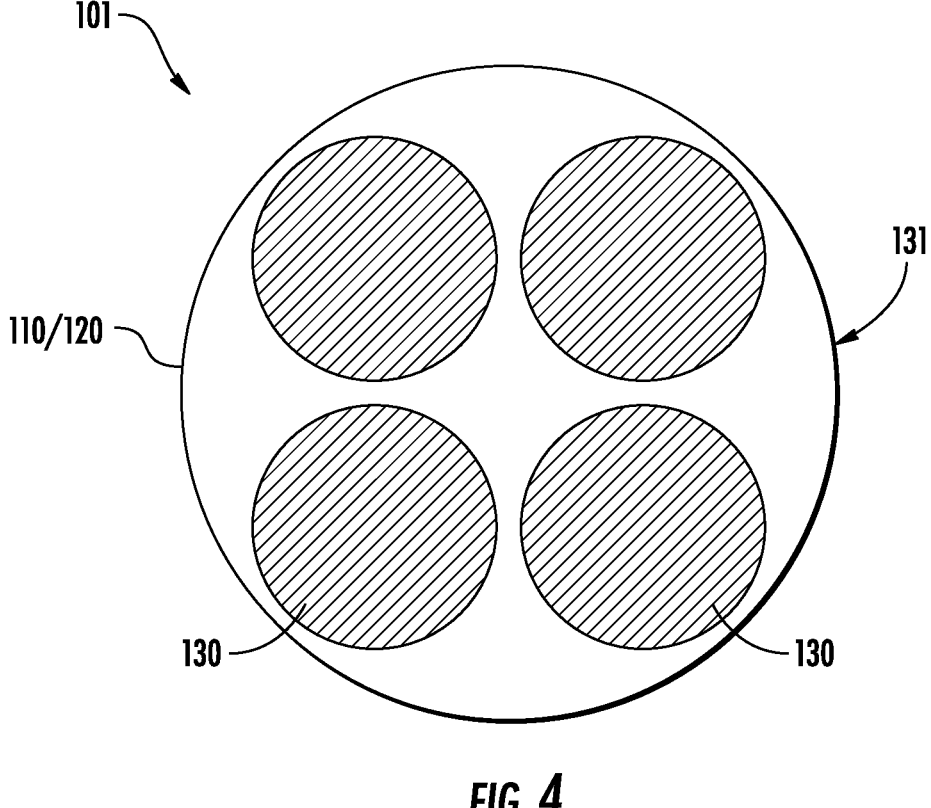
FIG. 4 is a schematic top-down view of stackable air treatment modules provided in parallel in accordance with embodiments.

With continued reference to FIG. 1 and with additional reference to FIG. 4, at least two air treatment modules 130 are stackable between the base 110 and the cover 120 and are operable in series (see FIG. 1), in parallel (see FIG. 4 with four parallel air treatment modules 130) or in combinations of serial and parallel arrangements. Unless otherwise stated, however, the instant description generally relates to the cases in which the at least two air treatment modules 130 are stackable between the base 110 and the cover 120 and are operable in series. This is being done for clarity and brevity and is not intended to otherwise limit the scope of the description.

With reference to FIG. 5, a method 500 of air pollution management is provided. As shown in FIG. 5, the method 500 includes determining a capacity of a source of air pollution in a space (block 501), selecting a group of one or more air treatment modules from a set of air treatment modules to provide an air purifying capacity that meets the capacity of the source of the air pollution (block 502) and stacking the group of the one or more air treatment modules between a base and a cover to form a stack configured to remove the air pollution from air in the space to thereby purify or clean the air in the space and/or condition the space for humidity (block 503). The method can further include interchanging one or more air treatment modules with any of the one or more air treatment modules in the stack (block 504) as the capacity of the source of the air pollution in the space changes over time.

Technical effects and benefits of the present disclosure are the provision of a stackable air treatment device that can be built for coverage and/or feature set that a customer desires.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:
1. A stackable air treatment device, comprising:
a base;

7 a cover; and a set of air treatment modules that are respectively inter-changeable with one another to be modularly stackable between the base and the cover in groups of one or more to form a stack with the base and the cover, the base, the cover and each air treatment module in the stack having a same peripheral shape and size for fitting together in the stack and each air treatment module in the stack comprising:

filter media; and a blower configured to move air from an exterior of the stack through the filter media and subsequently to and through the cover.

2. The stackable air treatment device according to claim 1, wherein the base, the cover, and each of the air treatment modules comprises a stacking element for engagement with a corresponding stacking element of a neighbor in the stack and a stacking direction of the stack is vertical or horizontal.

3. The stackable air treatment device according to claim 1, wherein a portion of the air treatment modules have differing capacities.

4. The stackable air treatment device according to claim 1, wherein at least two air treatment modules are stackable between the base and the cover and are operable in series or in parallel.

5. The stackable air treatment device according to claim 1, wherein the cover is formed to define an aperture and comprises filter media in the aperture.

6. The stackable air treatment device according to claim 1, wherein:

the base and the air treatment modules each comprise an inter-module power connector, and the stackable air treatment device further comprises a power distribution system configured to distribute power from the base to each air treatment module in the stack via the inter-module power connectors.

7. The stackable air treatment device according to claim 1, wherein, for each air treatment module:

the filter media is cylindrical, and the blower is disposed within the filter media and con-figured to draw the air through the filter media in 360° directions and subsequently to blow the air longitudi-nally.

8. The stackable air treatment device according to claim 1, further comprising at least one of:

an air quality monitor operably disposed to sense a quality of the air moved by the blower; and a control panel operably disposed on one of the cover and the base, the control panel being disposed and config-ured to control operations of the air treatment modules in the stack.

9. The stackable air treatment device according to claim 1, wherein at least one of the air treatment modules in the stack is provided as multiple air treatment modules in parallel.

* * * * *